INVENTOR
James H. Sherts
by
James E. Bradley
atty

Sept. 20, 1932.                J. H. SHERTS                1,878,899
                    APPARATUS FOR MAKING COMPOSITE GLASS
                         Filed June 1, 1928        4 Sheets-Sheet 3
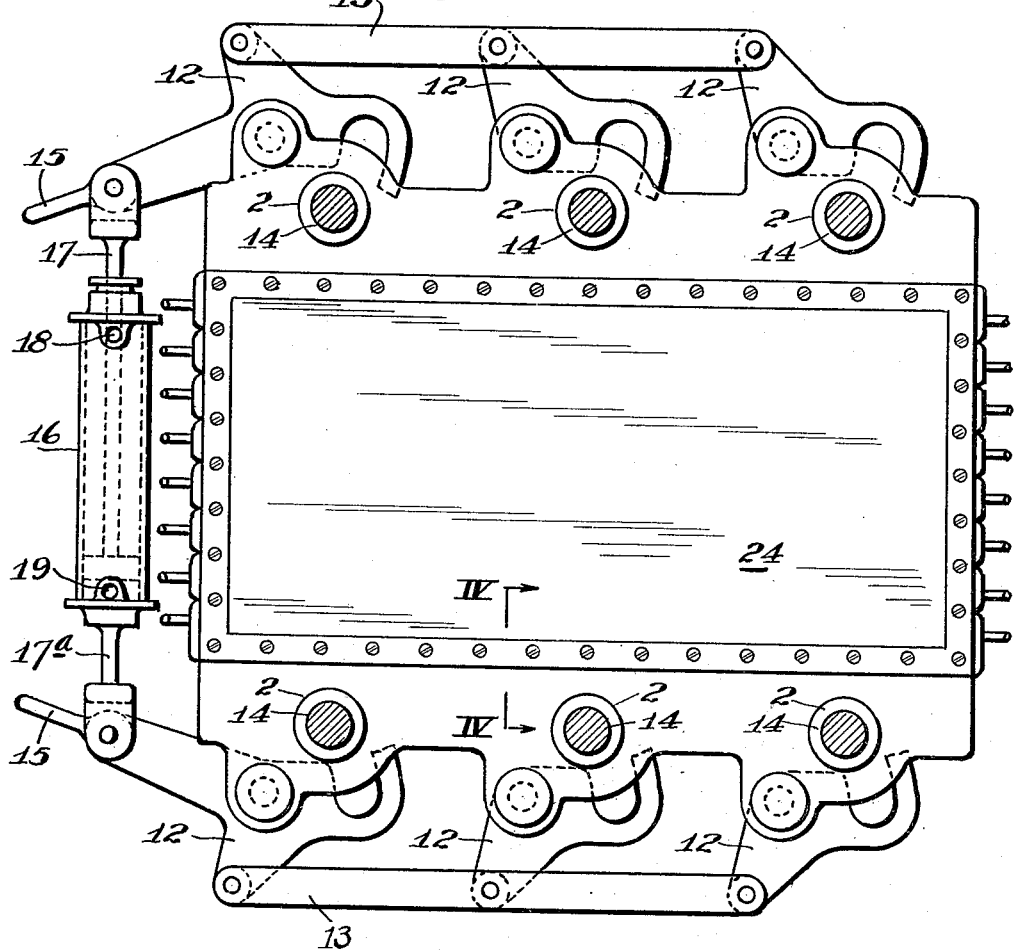
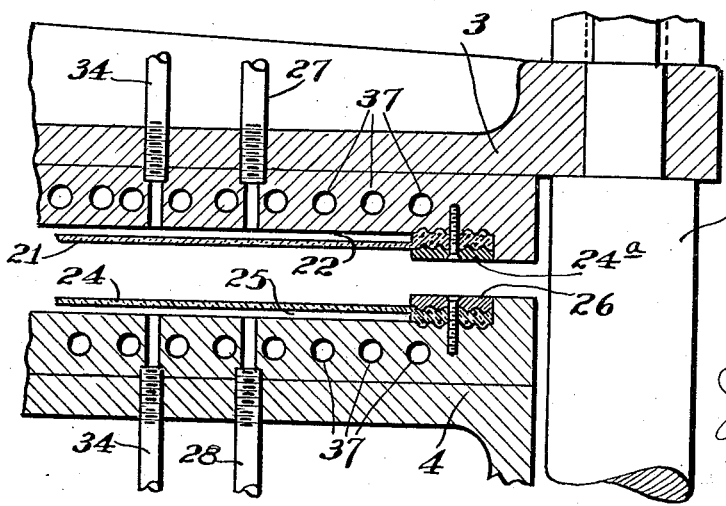
INVENTOR Patented Sept. 20, 1932

1,878,899

UNITED STATES PATENT OFFICE

JAMES H. SHERTS, OF GLEN RIDGE, NEW JERSEY, ASSIGNOR TO DUPLATE CORPORATION, A CORPORATION OF DELAWARE

APPARATUS FOR MAKING COMPOSITE GLASS

Application filed June 1, 1928. Serial No. 282,105.

Figure 1:
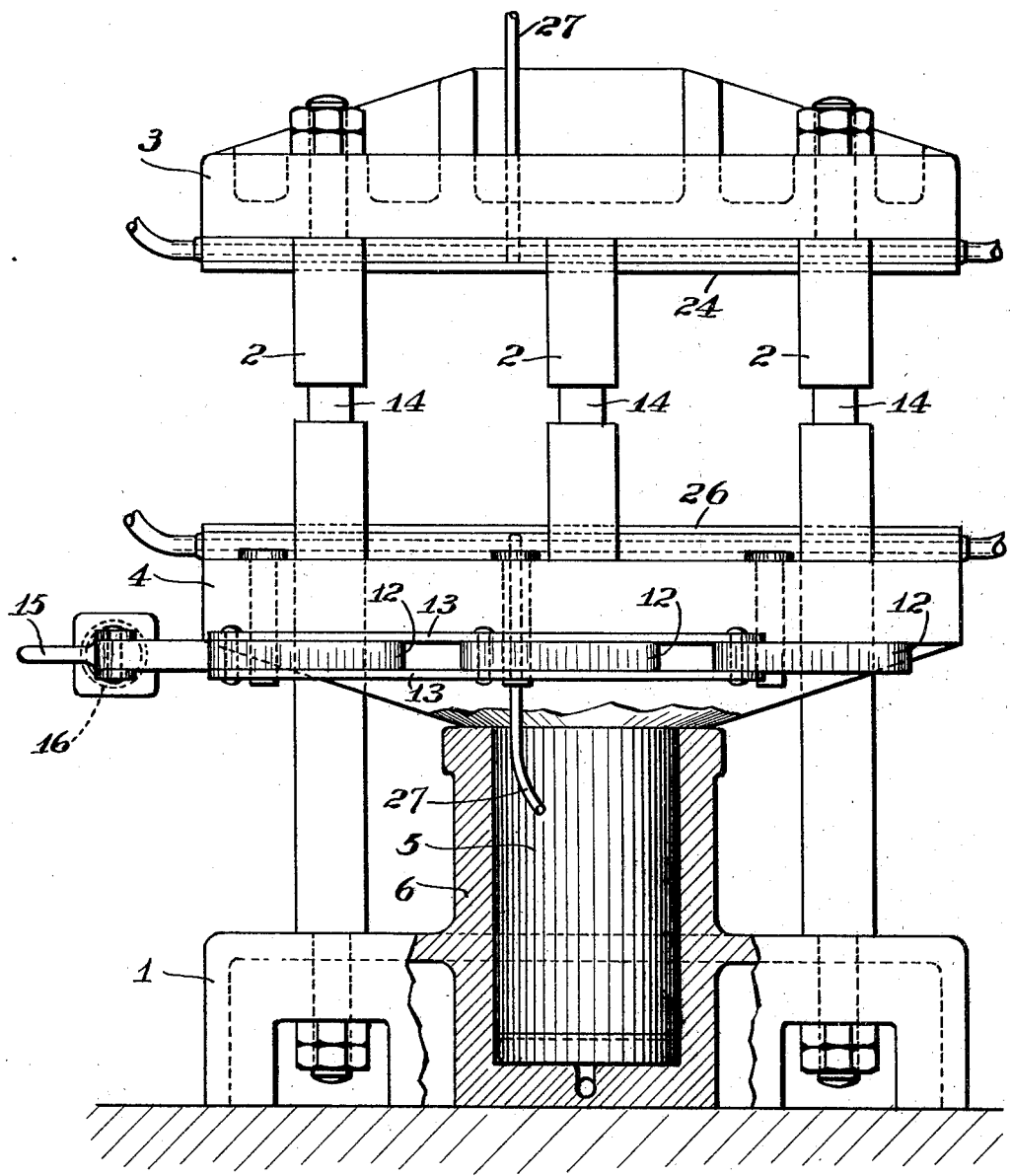
Figures 2, 5:
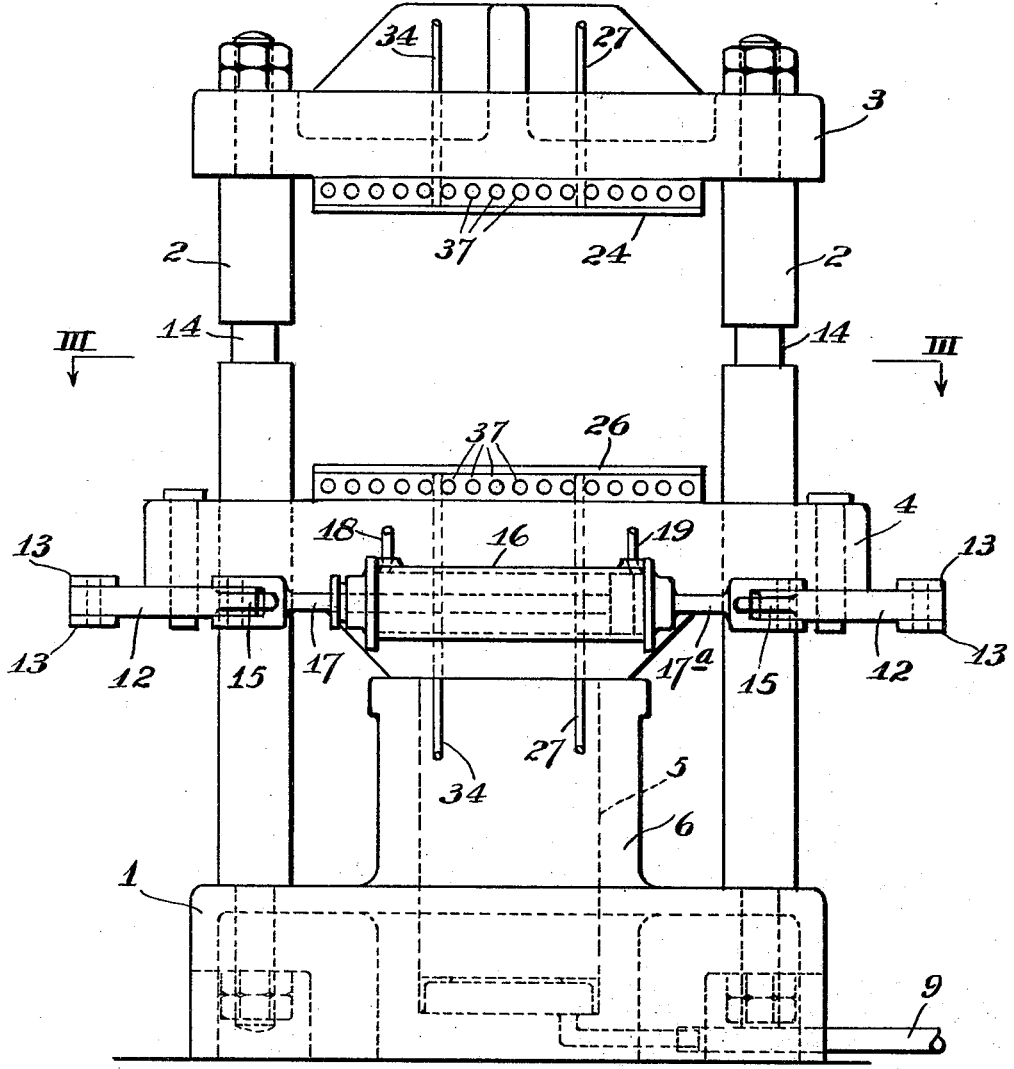
Figure 6:
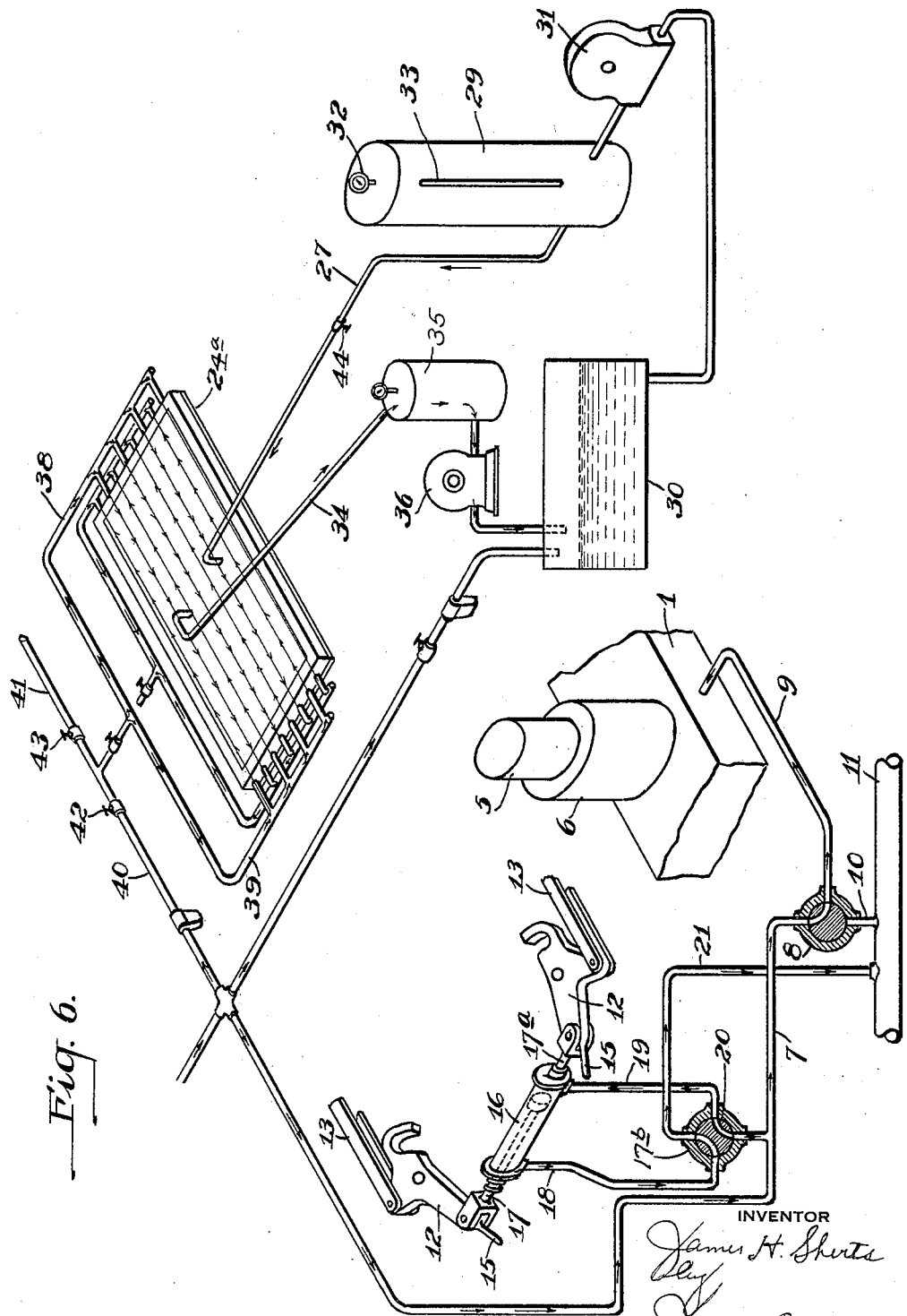

The invention relates to apparatus for making composite glass, wherein heat and pressure are applied to cause a joinder between the glass and pyroxylin or celluloid. Composite glass ordinarily comprises two sheets of glass with a sheet of pyroxylin or equivalent material cemented therebetween, although a greater number of sheets may be employed. It is the practice to assemble the sheets with a coating of cement, such as gelatin, dried upon the surfaces of the glass sheets which are to be cemented to the pyroxylin, the heat subsequently applied serving to soften the gelatin and secure adhesion when pressure is applied. The present invention has for its primary objects, the provision of an improved construction, wherein the period of time for heating and cooling the plates under pressure is reduced; and the provision of a construction which can be operated economically and with a low percentage of breakage incident to the application of relatively high temperatures and pressures to the glass sheets. Certain embodiments of the invention are illustrated in the accompanying drawings, wherein:

Figures 1 and 2 are side elevations taken at right angles to each other. Fig. 3 is a section on the line III—III of Fig. 2. Fig. 4 is a section on the line IV—IV of Fig. 3. Fig. 5 is a fragmentary detail section. And Fig. 6 is a perspective view showing a piping diagram of the apparatus.

In its preferred form, the apparatus comprises a pair of opposing separable platens having opposing chambers with flexible diaphragms constituting their outer walls between which the composite sheets to be joined are placed. After the platens are moved to closed position, liquid under the desired pressure is supplied to the chambers and a heating fluid, such as steam, is circulated through the platens to heat them, such platens in turn heating the liquid which is under pressure in the chambers. After the sheets have been heated to the requisite degree, the supply of steam through the platens is discontinued and a flow of cold water substituted to secure the cooling of the liquid in the chambers and the sheets between the diaphragms. The separation of the platens is a matter of convenience in placing the sheets to be joined in position and removing them, but is not as essential. Similarly, the use of steam for heating the platens is preferred, as a matter of economy, but the invention contemplates the use of any and all available means for heating the platens.

Referring to the drawings, 1 is the metal base of the press to which is rigidly secured the six vertical guide posts 2, 2, 2, etc. carrying at their upper ends the fixed platen 3. Mounted for up and down movement on the guide posts is the platen 4. This platen is moved up and down by means of the plunger 5 mounted in a hydraulic cylinder 6. The supply of liquid for operating the lifting device is arranged as indicated in Fig. 6, the supply pipe 7 being provided with the three-way valve 8 which in the position shown in Fig. 6 admits fluid under pressure to the lower end of the cylinder 6 to raise the plunger 5 and in another position brings the pipe 9 into communication with the pipe 10 leading to the drain 11, the plunger and table 4 descending by gravity when the valve is brought to this latter position.

When the platen 4 is in its upper position, it is locked rigidly in such position by means of the series of latches 12, 12, 12 secured together by the links 13, 13, as indicated in Fig. 3, such latches. when in closed position engaging the recesses 14, 14, 14 in the guide posts (Fig. 1). The latches may be swung in both directions by means of the handles 15, 15 or by means of a plunger in the cylinder 16 such plunger being provided at one end with the operating rod 17 pivoted to one of the handles 15. The other handle 15 is operated by a rod 17a secured in the head of the cylinder 16. The cylinder 16 is supplied with operating fluid from the pipe 7 as indicated in Fig. 6, such pipe being connected through the valve casing 17 with a pair of pipes 18, 19 leading to the ends of the cylinder. This cylinder is free to move endwise for the purpose later set forth. Mounted in the casing 17b is a four-way valve 20 which in the position shown admits fluid to the right hand end of the cylinder and permits it to exhaust from the left hand end through the pipe 21. When the valve occupies the position shown in Fig. 6, fluid is admitted to the right hand end of the cylinder and exhausts from the other end so that the rods 17 and 17a are both moved outward, thus moving the latches to closed position. When the valve 20 is moved 90 degrees in a clockwise direction, this condition is reversed, fluid being admitted to the left hand end of the cylinder and exhausted from the right hand end so that the rods 17 and 17a are moved inward, thus opening the latches.

Clamped to the lower side of the platen 3 is a flexible diaphragm 21, preferably of rubber, such diaphragm being spaced away from the face of the platen to provide the chamber 22. The edges of the diaphragm are preferably reinforced with strands of metal or fabric 23, as indicated in Fig. 5, such edge also being molded into corrugated form, as shown, and being clamped in place by means of the metal edge strips 24a. Similarly, the lower platen 4 is provided with a diaphragm 24 spaced away from the surface of the platen to provide a chamber 25 and secured in position by means of the clamping strips 26. Water under pressure is supplied to the chambers 22 and 25 by means of the pipes 27 and 28 connected to the tank 29 of Fig. 6, only one of such pipes being shown in this view. The tank 29 is supplied from the tank 30 by means of the pump 31, such pump preferably having an automatic control governed by the pressure in the tank 29 so that the pump will stop working when the presssure rises to a predetermined point, in the present case about 150 pounds per square inch. The tank has a pressure gauge 32 and a water gauge 33. Each chamber is also provided with an exhaust pipe 34 leading to the vacuum tank 35 (Fig. 6), such tank being exhausted by means of the pump 36, which discharged into the tank 30. This provides a means for withdrawing the liquid from the chambers 22 and 25 after the composite glass formed in the press has been removed therefrom.

Each of the platens is provided with a series of passages 37 connected to the pipes 38 and 39 (Fig. 6) and these pipes may be connected either to the water supply pipe 40 or to the steam supply pipe 41, depending on whether or not the valves 42 and 43 are opened or closed. This provides a means for first heating the platens and the composite glass therebetween during the pressing operation and then cooling such platens and the composite glass after the pressing operation.

The operation is preferably carried out as follows: Two sheets of glass with a sheet of pyroxylin therebetween are assembled on the diaphragm of the lower platen 4 when such platen is in its lowest position, as indicated in Fig. 2. The inner faces of the two sheets of glass have been covered with gelatin which has been dried thereon in order to provide the necessasry cement during the subsequent heating and pressing operation. Fluid is then admitted to the cylinder 6 to move the platen 4 upward until the clamping strips 24a are engaged by the clamping strips 26, at which time the latches 12, 12, 12, etc. are swung to closed position to positively lock the platen 4 in operative position. The valves 44 in the pressure lines 27 and 28 leading from the tank 29 to the chambers 22 and 25 are now opened so that a pressure of about 150 pounds per square inch is placed upon the sheets of glass lying between the diaphragms 22 and 24. Steam is now admitted through the passages 37 from the pipe 41 and the platens are rapidly heated by the circulation of steam therethrough until the glass sheets and pyroxylin are heated to a temperature of about 250 degrees F. This heating is accomplished by reason of the contact with the platens 3 and 4 with a body of liquid in the chambers 22 and 25, such liquid in turn heating the diaphragms 22 and 24 which lie in contact with the outer faces of the glass sheets. The heating of the liquid in the chambers 22 and 25 is accomplished very quickly because of the very slight depth of the chambers and the small quantity of liquid contained therein. After the sheets have attained a temperature of about 250 degrees F., the valve 43 in the steam pipe is closed and water is circulated through the passages 37 from the pipe 40, the valve 42 being opened at this time. In this manner, the platens, the liquid in the chambers 22 and 25, and the sheets of material lying between the diaphragms 22 and 24 are cooled to a temperature at which they may be conveniently handled, pressure being maintained during this cooling operation in the chambers 22 and 25, as it has been found necessary to cool the composite plate under pressure in order to insure a proper union between the various sheets making up the plate. After the plate has been cooled, the water is withdrawn from the chambers 22 and 25 by means of the vacuum tank 35 and the latches 12, 12, 12, etc. are opened. On moving the three-way valve 8 (Fig. 6) to exhaust position, the water in the cylinder 6 flows to the drain 11 permitting the platen 4 to move back to open position, as shown in Figs. 1 and 2.

What I claim is:

1. Apparatus for applying heat and pressure to a plurality of sheets to be joined together, comprising a pair of opposing separable platens having passages therethrough and provided on their front sides with chambers facing each other, a flexible diaphragm seated across the open face of each chamber constituting a closure therefor, means for supplying liquid under pressure to the chambers, and means for supplying a heating fluid to said passages to heat the platens so that they will in turn heat the liquid in said chambers.

2. Apparatus for applying heat and pressure to a plurality of sheets to be joined together comprising a pair of separable platens having passages therethrough and each carrying on its outer side a chamber having a flexible outer wall, means for supplying liquid under pressure to the chambers, and means for supplying a heating fluid to said passages to heat the platens so that they will in turn heat the liquid in said chambers.

In testimony whereof, I have hereunto subscribed my name this 28th day of May, 1928.

JAMES H. SHERTS.